US011054661B2

(12) United States Patent
Tan

(10) Patent No.: US 11,054,661 B2
(45) Date of Patent: Jul. 6, 2021

(54) NEAR-EYE DISPLAY DEVICE AND NEAR-EYE DISPLAY METHOD

(71) Applicant: BOE TECHNOLOGY GROUP CO., LTD., Beijing (CN)

(72) Inventor: Jifeng Tan, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/496,792

(22) PCT Filed: Mar. 29, 2019

(86) PCT No.: PCT/CN2019/080486
§ 371 (c)(1),
(2) Date: Sep. 23, 2019

(87) PCT Pub. No.: WO2019/214366
PCT Pub. Date: Nov. 14, 2019

(65) Prior Publication Data
US 2020/0379268 A1 Dec. 3, 2020

(30) Foreign Application Priority Data

May 10, 2018 (CN) .......................... 201810444552.X

(51) Int. Cl.
G02B 27/10 (2006.01)
F21V 8/00 (2006.01)
(52) U.S. Cl.
CPC ........... *G02B 27/106* (2013.01); *G02B 6/003* (2013.01); *G02B 6/0031* (2013.01); *G02B 6/0035* (2013.01)
(58) Field of Classification Search
CPC .... G02B 27/106; G02B 6/0035; G02B 6/003; G02B 6/0031
See application file for complete search history.

(56) References Cited

U.S. PATENT DOCUMENTS 10,210,844 B2 2/2019 Kollin et al.
2010/0033680 A1* 2/2010 Krijn .................... H04N 13/327
353/8
(Continued)

FOREIGN PATENT DOCUMENTS

CN 101739984 A 6/2010
CN 105074322 A 11/2015
(Continued)

OTHER PUBLICATIONS

CN107340603A, Nov. 2017, machine translation (Year: 2017).*
(Continued)

*Primary Examiner* — Tracie Y Green
(74) *Attorney, Agent, or Firm* — Westman, Champlin & Koehler, P.A.

(57) ABSTRACT

A near-eye display device and a near-eye display method for human eye of an observer are provided in embodiments of the disclosure, the near-eye display device including: a light source device, configured to emit a plurality of single-colored light beams sequentially; a light guide device, on a light-emergent side of the light source device, and configured to receive and transmit the plurality of single-colored light beams from the light source device and to guide the plurality of single-colored light beams to emit outwards from a light-emergent side of the light guide device; a display panel, on the light-emergent side of the light guide device and comprising a plurality of pixels, and configured to receive the plurality of single-colored light beams from the light guide device and to control both color and grayscale of emergent light beams generated by the plurality of snide-colored light beams which are incident on the display panel and transmitted through the plurality of pixels, and then exit the display panel; and a light-splitting device, on a light-emergent side of the display panel and configured to split emergent light beams from individual ones of the (Continued)

plurality of pixels into a plurality of sub-beams propagating towards a plurality of viewpoints of a-the human eye respectively

20 Claims, 4 Drawing Sheets

(56) References Cited

U.S. PATENT DOCUMENTS

| | | | |
|---|---|---|---|
| 2013/0120467 A1* | 5/2013 | Hou | G09G 3/3666 345/690 |
| 2016/0018582 A1 | 1/2016 | Fiorentino et al. | |
| 2016/0033705 A1 | 2/2016 | Fattal | |
| 2016/0379606 A1 | 12/2016 | Kollin et al. | |
| 2017/0061702 A1* | 3/2017 | Christen | G02B 27/017 |
| 2017/0090096 A1* | 3/2017 | Fattal | G02B 27/425 |
| 2018/0252933 A1 | 9/2018 | Wang et al. | |
| 2019/0094447 A1 | 3/2019 | Tan et al. | |
| 2019/0212560 A1* | 7/2019 | Sugiyama | B60K 37/06 |

FOREIGN PATENT DOCUMENTS

| | | |
|---|---|---|
| CN | 105892064 A | 8/2016 |
| CN | 106291958 A | 1/2017 |
| CN | 106662700 A | 5/2017 |
| CN | 107340603 A | 11/2017 |
| CN | 107422532 A | 12/2017 |
| CN | 107621729 A | 1/2018 |
| CN | 107850780 A | 3/2018 |
| CN | 108646412 A | 10/2018 |
| JP | 5218438 B2 | 6/2013 |

OTHER PUBLICATIONS

First Office Action, including Search Report, for Chinese Patent Application No. 201810444552.X, dated Jul. 9, 2019, 13 pages.
Second Office Action, including Search Report, for Chinese Patent Application No. 201810444552.X, dated Sep. 9, 2019, 8 pages.
Third Office Action, including Search Report, for Chinese Patent Application No. 201810444552.X, dated Feb. 10, 2020, 13 pages.

* cited by examiner

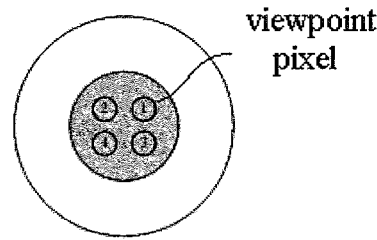
Fig.1
Fig.2
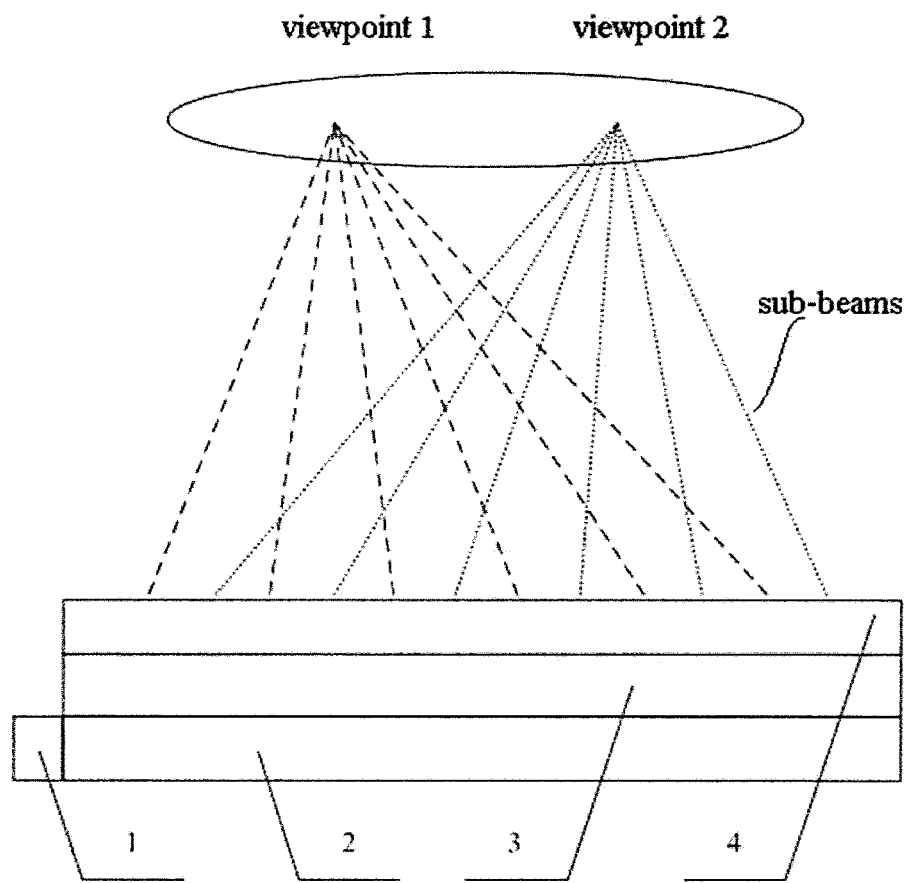
Fig.3

NEAR-EYE DISPLAY DEVICE AND NEAR-EYE DISPLAY METHOD

CROSS-REFERENCE TO RELATED INVENTION

This application is a Section 371 National Stage Application of International Application No. PCT/CN2019/080486, filed on Mar. 29, 2019, entitled " NEAR-EYE DISPLAY DEVICE AND NEAR-EYE DISPLAY METHOD", which has not been published yet, which claims priority to Chinese Patent Application Invention No. 201810444552.X filed on May 10, 2018 in the China National Intellectual Property Administration, the whole disclosure of which is incorporated herein by reference.

BACKGROUND OF THE DISCLOSURE

Field of the Disclosure

Embodiments of the present disclosure generally relate to the technical field of display technology, and in particular, to a near-to-eye display or near-eye display (abbreviated as NED) device and a near-eye display method.

Description of the Related Art

In recent years, as applications constructed on the basis of near-eye display technology, such as Virtual Reality (VR)/Augmented Reality (AR) devices, have gradually be utilized in fields such as display, game, medical treatment and the like, near-eye display technology has been subject to more and more attention and research. At present, as far as a near-eye display device for implementing 3D display is concerned, its operation principle lies in that, typically, a display screen thereof is divided into two separate display regions comprising a left display region for displaying left-eye image and a right display region for displaying right-eye image, and then a 3D display effect is obtained by taking advantage of binocular parallax due to a fact that different parallax pictures/frames of a same scene/scenario are displayed respectively in the left display region and the right display region. Since this type of near-eye display device operates on the basis of an operation principle of generating binocular parallax, then a focus position of either a single eye in a respective left display region or a right display region in practice falls on the display screen (especially for example on a plane where the display screen lies), rather than being ideally located (i.e., focused) on a 3D scene having expected specific three-dimensional depth of field which is displayed on the display screen; therefore, there may appear a problem of difference/inconsistence between a monocular focusing distance with a single eye and a binocular convergence distance of a 3D display effect obtained with dual eyes; and with a process in switching and playing process of the 3D scene, such a difference/inconsistency may readily result in discomfort such as dizziness of an observer and the like. As such, in relevant art, a solution in which a 3D scene having three-dimensional depth of field may be observed by a focusing with a single eye is provided (which is abbreviated as a "monocular depth of field" solution), specifically, it implements a 3D display effect on the basis of monocular focusing, by focusing a plurality of pictures displaying same scene with different parallax onto different viewpoints of one and the same eye of the observer, respectively. In such a case, by monocular focusing, the focus may fall on the 3D scene being displayed, rather than falling on the display screen, avoiding the problem of difference/inconsistence between the monocular focusing distance and the binocular convergence distance.

SUMMARY OF THE DISCLOSURE

The embodiments of the present disclosure have been made to overcome or alleviate at least one aspect of the above mentioned disadvantages and/or shortcomings in the prior art, by providing a near-to-eye display or near-eye display (abbreviated as NED) device and a near-eye display method in embodiments of the disclosure, intending to increase display resolution of near-eye display significantly/drastically.

Following technical solutions are adopted in exemplary embodiments of the disclosure.

According to one aspect of embodiments of the disclosure, there is provided a near-eye display device for human eye of an observer, comprising:

a light source device, configured to emit a plurality of single-colored light beams sequentially;

a light guide device, on a light-emergent side of the light source device, and configured to receive and transmit the plurality of single-colored light beams from the light source device and to guide the plurality of single-colored light beams to emit outwards from a light-emergent side of the light guide device;

a display panel, on the light-emergent side of the light guide device and comprising a plurality of pixels, and configured to receive the plurality of single-colored light beams from the light guide device and to control both color and grayscale of emergent light beams generated by the plurality of single-colored light beams which are incident on the display panel and transmitted through the plurality of pixels, and then exit the display panel; and a light-splitting device, on a light-emergent side of the display panel and configured to split emergent light beams from individual ones of the plurality of pixels into a plurality of sub-beams propagating towards a plurality of viewpoints of the human eye respectively.

According to embodiments of the disclosure, wherein the light source device comprises:

a light-emitting device, configured to sequentially emit the plurality of single-colored light beams having different colors respectively, in a display period; and a pre-collimator and a light-incident portion, the pre-collimator being located on a light-emergent side of the light-emitting device and configured to transmit the plurality of single-colored light beams to be incident onto the light-incident portion at respective predetermined angles, and the light-incident portion being located on a light-emergent side of the pre-collimator and configured to transmit the plurality of single-colored light beams to be incident angularly onto the light guide device, respectively.

According to embodiments of the disclosure, wherein the light-emitting device comprises a red light-emitting device, a green light-emitting device and a blue light-emitting device; the pre-collimator comprises a lens; and the light-incident portion is provided with a light-incident surface abutting tightly against the pre-collimator and a reflective surface opposite to the light-incident surface, the reflective surface being a wedge reflective surface or a parabolic reflective surface.

According to embodiments of the disclosure, wherein the light guide device comprises:

a light guide plate on a substrate and configured to transmit the plurality of single-colored light beams from the light source device in a total-reflection manner; and a plurality of light-emergent components, arranged in a matrix at a light emergent surface of the light guide plate, and configured to guide the plurality of single-colored light beams transmitted within the light guide plate to be incident onto individual ones of the plurality of pixels of the display panel at positions of the plurality of light-emergent components.

According to embodiments of the disclosure, wherein the plurality of light-emergent components comprise a plurality of light-extracting blocks arranged in a matrix on the light emergent surface of the light guide plate, a refractive index of the plurality of light-extracting blocks being larger than or equal to a refractive index of the light guide plate, and the plurality of light-emergent components being formed by the plurality of light-extracting blocks.

According to embodiments of the disclosure, wherein the light guide device further comprises: a filling layer, on the light-emergent surface of the light guide plate and covering the plurality of light-emergent components, the refractive index of the light guide plate being larger than each of a refractive index of the filling layer which is in contact with the light guide plate and a refractive index of the substrate.

According to embodiments of the disclosure, wherein the positions of the plurality of light-emergent components are set to be in one-to-one correspondence with positions of individual ones of the plurality of pixels of the display panel.

According to embodiments of the disclosure, wherein the positions of the plurality of light-emergent components and the positions of individual ones of the plurality of pixels of the display panel are set such that the plurality of single-colored light beams are transmitted to individual ones of the plurality of pixels after exiting the plurality of light-emergent components.

According to embodiments of the disclosure, wherein orthogonal projections of the plurality of light-emergent components on the display panel at least partially overlap with respective ones of the plurality of pixels.

According to embodiments of the disclosure, wherein the display panel comprises: a first substrate and a second substrate provided opposite to each other, without any color filter layer being disposed on either one of the first substrate and the second substrate; and a liquid crystal layer interposed between the first substrate and the second substrate.

According to embodiments of the disclosure, wherein the light-splitting device comprises a plurality of light-splitters arranged in a matrix on the light-emergent surface of the display panel, a position of each of the plurality of light-splitters being in one-to-one correspondence with a position of a respective one of the plurality of pixels of the display panel, and the plurality of light-splitters in one-to-one correspondence with respective ones of the plurality of pixels at different positions on the display panel differing in structure thereof from one another.

According to embodiments of the disclosure, wherein each of the plurality of light-splitters comprises a plurality of sub-splitters arranged regularly, each of which is configured to transmit a respective sub-beam of a plurality of sub-beams produced by splitting a respective one of the plurality of light beams from individual ones of the plurality of pixels, towards a respective one of the plurality of viewpoints of the human eye.

According to another aspect of the exemplary embodiment of the present disclosure, there is provided a virtual/augmented reality apparatus, comprising the near-eye display device as above.

According to still another aspect of the exemplary embodiment of the present disclosure, there is provided a near-eye display method for human eye of an observer, comprising:

emitting a plurality of single-colored light beams by a light source device sequentially, the plurality of single-colored light beams being incident angularly onto a light guide device located on a light-emergent side of the light source device;

receiving and transmitting the plurality of single-colored light beams from the light source device by the light guide device to guide the plurality of single-colored light beams to emit outwards from a light-emergent side of the light guide device and then be incident on a display panel;

controlling, by the display panel located on the light-emergent side of the light guide device and comprising a plurality of pixels, both color and grayscale of emergent light beams generated by the plurality of single-colored light beams which are incident on the display panel and transmitted through the plurality of pixels; and splitting emergent light beams from individual ones of the plurality of pixels into a plurality of sub-beams propagating towards a plurality of viewpoints of the human eye respectively, by a light-splitting device.

According to embodiments of the disclosure, wherein the light source device comprises a light-emitting device, a pre-collimator and a light-incident portion, and the step of "emitting a plurality of single-colored light beams by a light source device sequentially, the plurality of single-colored light beams being incident angularly onto a light guide device located on a light-emergent side of the light source device" comprises:

sequentially emitting the plurality of single-colored light beams having different colors respectively, in a display period, by the light-emitting device;

utilizing the pre-collimator to transmit the plurality of single-colored light beams to be incident onto the light-incident portion at respective predetermined angles; and utilizing a wedge reflective surface or a parabolic reflective surface of the light-incident portion to transmit the plurality of single-colored light beams to be incident angularly onto the light guide device, respectively.

According to embodiments of the disclosure, wherein the step of "sequentially emitting the plurality of single-colored light beams having different colors respectively, in a display period, by the light-emitting device" comprises:

emitting in each of a plurality of light-emitting time periods within an one-frame display period single-colored light beams of a respective one color.

According to embodiments of the disclosure, wherein the light guide device comprises a light guide plate and a plurality of light-emergent components, and the step of "receiving and transmitting the plurality of single-colored light beams from the light source device by the light guide device to guide the plurality of single-colored light beams to emit outwards from a light-emergent side of the light guide device and then be incident on a display panel" comprises:

transmitting the plurality of single-colored light beams towards the plurality of light-emergent components in a total-reflection manner by the light guide plate; and guiding the plurality of single-colored light beams, which are transmitted within the light guide plate, by the plurality of light-emergent components to be incident onto individual ones of the plurality of pixels of the display panel at positions of the plurality of light-emergent components.

According to embodiments of the disclosure, wherein the step of "controlling, by the display panel located on the light-emergent side of the light guide device and comprising a plurality of pixels, both color and grayscale of emergent light beams generated by the plurality of single-colored light beams which are incident on the display panel and transmitted through the plurality of pixels" comprises:

implementing a control on both color and grayscale of a respective emergent light beam of each of the plurality of pixels within a display period, by utilizing a respective data signal applied to said each of the plurality of pixels through a respective data line by the display panel to adjusting grayscale of the respective emergent light beam emitted outwards from said each of the plurality of pixels within the display period.

Of course, it may not be necessary to implement all advantages as above simultaneously in implementation of any of the products or methods according to embodiments of the present disclosure. Other features and advantages of the embodiments of the present disclosure will be set forth hereinafter in embodiments of the specifications, and will become apparent in part from embodiments of the specifications, or become understood by implementing embodiments of the disclosure. The objects and other advantages of the embodiments of the present invention can be realized and obtained by specific structures particularly pointed out in the description, the claims and the drawings.

BRIEF DESCRIPTION OF THE DRAWINGS

The drawings are used to provide a further understanding of the technical scheme of the present disclosure embodiments and form part of the specification. The drawings, together with the embodiments of the present application, are used to explain the technical solution of the present disclosure embodiments, but fail to constitute a limitation on the technical solution of the present disclosure embodiments. Shapes and sizes of various components in the drawings do not reflect the true proportions, and are intended only to illustrate the contents of the present disclosure.

FIG. 1 illustrates a schematic view of various viewpoints of an eye in a "monocular depth of field" solution having four viewpoints;

FIG. 2 illustrates a schematic view of various viewpoints of a display screen in a "monocular depth of field" solution having four viewpoints;

FIG. 3 illustrates a schematic structural view of a near-eye display device according to exemplary embodiments of the disclosure;

DETAILED DESCRIPTION OF PREFERRED EMBODIMENTS OF THE INVENTION

Figure 4:
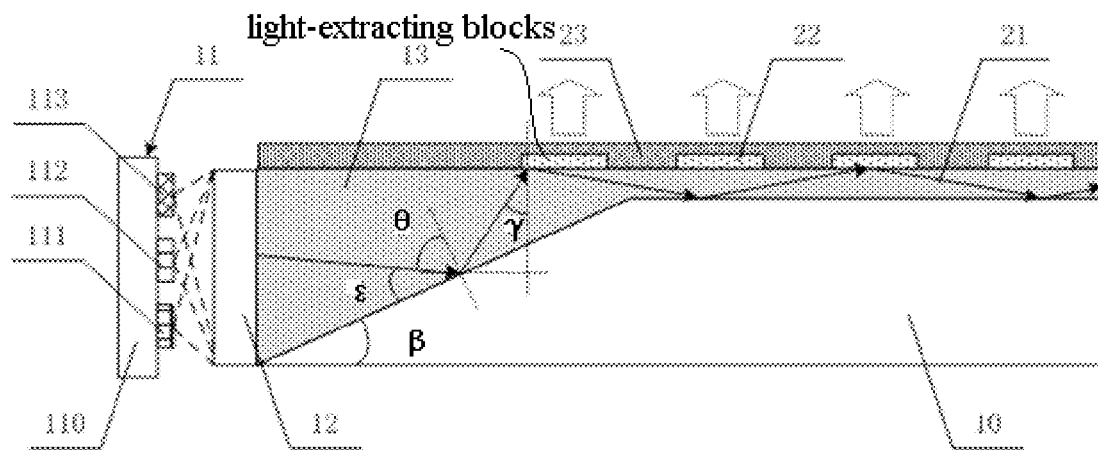
FIG. 4 illustrates a schematic structural view of a light source device and a light guide device according to exemplary embodiments of the disclosure.

Specific embodiments of the present disclosure are described in further detail below in conjunction with the drawings and examples. The following embodiments are used to illustrate the embodiments of the present disclosure, but are not intended to limit the scope of the embodiments of the present disclosure. It should be noted that, in the absence of conflict, the embodiments in the present application and the features in the embodiments, such as arbitrary combinations of each other, are provided.

In order to implement a "monocular depth of field" solution, each pixel of a display screen should at least be split into a plurality of display regions; and the more the specific number of the plurality of display regions formed by splitting each pixel is, the more the specific number of viewpoints focused on a single eye is, and thus the better the observation effect is. In a practical case, a direction of sight line is defined to be a direction pointing towards a 3D scene being observed by a human eye of the observer from the human eye. FIG. 1 illustrates a schematic view of various viewpoints of an eye, as seen in a direction which is a reverse direction opposite to the direction of sight line and pointing towards the human eye, in a "monocular depth of field" solution having four viewpoints. And FIG. 2 illustrates a schematic view of various viewpoints of a display screen, as seen in the direction which is a reverse direction opposite to the direction of sight line and pointing towards the human eye, in a "monocular depth of field" solution having four viewpoints. As illustrated in FIG. 1 and FIG. 2, in a design of the display screen, in order to implement focusing of four viewpoints on a single eye, each pixel of the display screen should be divided into four display regions, i.e., four viewpoint pixels are defined; in other words, in order to implement the "monocular depth of field" solution, each of the plurality of display regions formed by splitting each pixel of the display screen is defined as a viewpoint pixel. If each viewpoint pixel is designed to have the same size as an original pixel, then an area of each pixel designed correspondingly is 4 times an area of the original pixel. As such, not only the display resolution of the display screen is significantly/drastically decreased, but also, in the near-eye display use, the human eye may easily recognize/identify a practical pixel image presented originally by various viewpoint pixels of each pixel of the display screen since the screen is next to the human eye, so as to interfere with a visual 3D scene which is formed by a convergence of the human eye and has a three-dimensional depth of field, thus influencing significantly the observation of 3D display effect. If the original pixel is split into 4 portions to function as four respective viewpoint pixels respectively in the design of the display screen, then the area of each viewpoint pixel is ¼ of the area of the original pixel, which may not influence the display resolution and the display effect, but is hard to decrease dimension of the pixel effectively due to restriction applied by relevant process level.

Therefore, as to the "monocular depth of field" solution, it is required to increase the display solution for observation of 3D display scene in a condition of relevant process level.

In order to increase the display resolution of near-eye display significantly, in one aspect of embodiments of the disclosure, a near-eye display device for human eye of an observer is provided. FIG. 3 illustrates a schematic structural view of a near-eye display device according to exemplary embodiments of the disclosure, as illustrated in FIG. 3, a main body of the near-eye display device for human eye of an observer, comprises: a light source device 1, a light guide device 2, a display panel 3, and a light-splitting device 4. The light source device 1 is for example a side-lit light source as illustrated (i.e., it is arranged on a side portion of the light guide device 2 in a direction orthogonal to a normal direction of the display panel 3 of the near-eye display device; in other words, arranged on a lateral side of the light guide device 2 as illustrated), and is configured to emit a plurality of single-colored light beams having different colors from one another sequentially (e.g., periodically or non-periodically), each type of the plurality of single-colored light beams of one and the same color being incident onto the light guide device 2 from the side portion angularly relative to the side portion (i.e., at a preset angle). The light guide device 2 is located on a light-emergent side of the light source device, and configured to receive and transmit the plurality of single-colored light beams from the light source device and to guide the plurality of single-colored light beams to emit outwards (at a set position thereof, e.g., on a light-emergent side of the light guide device; more specifically, for example, at positions of light-extracting portions on a surface of the light guide device 2 abutting against the display panel 3), for example to exit towards the display panel 3. The display panel 3 is located on the light-emergent side of the light guide device and comprises a plurality of pixels, and configured to control both color and grayscale of emergent light beams generated by the plurality of single-colored light beams which are incident on the display panel 3 from the light guide device and transmitted through the plurality of pixels, and then exit the display panel. The light-splitting device 4 is located on a light-emergent side of the display panel and configured to split emergent light beams from individual ones of the plurality of pixels into a plurality of sub-beams of light rays propagating towards a plurality of viewpoints of the human eye respectively.

In embodiments of the disclosure, the plurality of single-colored light beams having different colors provided by the light source device 1 are sequentially emitted in a display period. For example, the display period is an one-frame display period, which is split into a plurality of light-emitting time periods (e.g., equally divided into a plurality of light-emitting time periods having one and the same duration respectively), in each of which the light source device 1 emits single-colored light beams of a respective one color exiting towards the light guide device 2. The light guide device 2 is configured to guide the light beams from the light source device 1 to pass therethrough by being transmitted therein and in turn to exit outwards to be incident onto individual ones of the plurality of pixels of the display panel 3 at position of light-extracting portions which are preset, and a position of each of the plurality of light-extracting portions of the light guide device 2 is set to be in one-to-one correspondence with a position of a respective one of the plurality of pixels of the display panel 3 (the expression "in one-to-one correspondence with" here means that light beams exit the light-extracting portions and are then transmitted to respective pixels; more specifically, for example, a position of each light-extracting portions is arranged to align with a position of a respective one of the plurality of pixels of the display panel, i.e., an orthogonal projection of each light-extracting portion on the display panel at least partially overlaps with a respective pixel of the display panel). By way of example, an area of each light-extracting portion is the same as an area of an active area (also abbreviated as 'AA'; i.e., an effective display area) of a respective pixel, facilitating an implementation that the orthogonal projection of each light-extracting portion on the display panel completely/perfectly overlaps with the respective pixel on the display panel. Moreover, by way of example, the light guide device 2 is specifically configured to guide light beams to exit at positions of light-extracting portions thereof as preset and to be incident in a preset direction onto individual ones of the plurality of pixels of the display panel 3, in a preset direction, which preset direction is specifically for example set to be a collimated direction perpendicular to the display panel, i.e., the normal direction of the display panel. The display panel 3 is located on the light-emergent side of the light guide device, specifically for example on a light-emergent surface of the light guide device; and is for example specifically in the form of a liquid crystal panel without any color filter layer, and the display panel is configured to adjust grayscale of the respective emergent light beam emitted outwards from each of the plurality of pixels within the display period (e.g., in an one-frame display period) on the basis of a respective data signal, essentially facilitating implementing a control on both color and grayscale of a respective emergent light beam of each of the plurality of pixels within the one-frame display period. The light-splitting device 4 is located on the light-emergent side of the display panel, specifically for example on a light-emergent surface of the display panel 3 facing away from the light guide device 2, and is configured to split the emergent light beams of each of the plurality of pixels on the display panel 3 into a plurality of partial light beams each of which functions as or becomes a plurality of sub-beams propagating towards a plurality of viewpoints of the human eye respectively.

According to embodiments of the disclosure, the near-eye display device is provided, which is provided with the light source device, the light guide device, the display panel and the light-splitting device; as such, not only a "monocular depth of field" near-eye display is implemented which utilizes a focusing on multiple viewpoints on a single eye, but also the display resolution is significantly/drastically enhanced.

The near-eye display device according to embodiments of the disclosure is for example implemented in various ways, and technical solutions of embodiments of the disclosure are set forth in detail hereinafter by way of specific embodiments.

According to some embodiments of the disclosure, FIG. 4 illustrates a schematic structural view of the light source device and the light guide device according to exemplary embodiments of the disclosure. As illustrated in FIG. 4, the light source device 1 specifically for example comprises a light-emitting device 11, a pre-collimator 12 and a light-incident portion 13. The light-emitting device 11 comprises a plurality of single-colored light-beam sources disposed adjacent to one another (or even abutting against one another tightly, or arranged in a form of a matrix in which the plurality of single-colored light-beam sources are spaced apart from one another merely at gaps thereamong), which are for example illustrated to be arranged in the normal direction of the display panel 3 of the near-eye display device (i.e., a vertical direction as illustrated) and configured to sequentially emit the plurality of single-colored light beams sequentially having different colors from one another within one display period; the pre-collimator 12 is provided on a light-emergent side of the light-emitting device 11 (e.g., aligned with the plurality of single-colored light-beam sources, as illustrated) and spaced apart from the plurality of single-colored light-beam sources at a uniform spacing therebetween as illustrated, and is configured to carry out a pre-collimating process on the single-colored light beams having different colors from one another which are emitted by the light-emitting device 11, and in turn to guide individual ones of the single-colored light beams to be incident onto the light-incident portion 13 at respective angles (e.g., preset angles). The light-incident portion 13 is provided on a substrate 10 (more specifically, an inclined surface of the light-incident portion 13 abutting against an inclined side surface of the substrate 10), and is located on a light-emergent side of the pre-collimator 12 (for example, a light-emergent surface of the pre-collimator 12 abutting against the light-incident surface of the light-incident portion 13 tightly, as illustrated; more specifically, the light-emergent surface of the pre-collimator 12 and the light-incident surface of the light-incident portion 13 have identical shapes and identical sizes and fit together and are bonded to each other closely and perfectly), between the pre-collimator 12 and the light guide device 2 (and the pre-collimator 12 and the light guide device 2 are for example orthogonal to each other and spaced apart from each other), and is configured to transmit individual ones of the plurality of single-colored light beams to be incident at respective preset angles onto the light guide device, respectively. More specifically, for example, the light-emitting device 11 comprises a lamp bar 110 and a plurality of single-colored light-emitting devices which are provided adjacent to one another and on the lamp bar, such as red (R) light-emitting device(s) 111, green (G) light-emitting device(s) and blue light-emitting device(s) 113. More specifically, for example, the plurality of single-colored light-emitting devices such as red (R) light-emitting device(s) 111, green (G) light-emitting device(s) 112 and blue light-emitting device(s) 113 are provided on a surface of the lamp bar 110 facing towards the pre-collimator 12; furthermore, the pre-collimator 12 being provided to align with the plurality of single-colored light-beam sources specifically means that, orthogonal projections of the plurality of single-colored light-beam sources on the light-incident portion 13 are covered by an orthogonal projection of the pre-collimator 12 on the light-incident portion 13. In practical implementation, the light-emitting device may for example be additionally provided with single-colored light-emitting devices having other color(s), more specifically, for example, yellow (Y) light-emitting devices; or alternatively, for example, the number of single-colored light-emitting devices contained in the light-emitting device may be larger than 3, more specifically, e.g., a single red light-emitting device 111, a single green light-emitting device 112, and a single blue light-emitting device 113 which are provided adjacent to one another are formed to be a group of colored light-emitting devices, and a plurality of groups of colored light-emitting devices are provided alternately (for example spaced apart from each other or one another). In a condition that RGB light-emitting devices are used, for example, red light-emitting diode(s) (LED), green light-emitting diode(s) and blue light-emitting diode(s) are used to function as the red light-emitting device(s), the green light-emitting device(s), and the blue light-emitting device(s), respectively.

Figure 5:
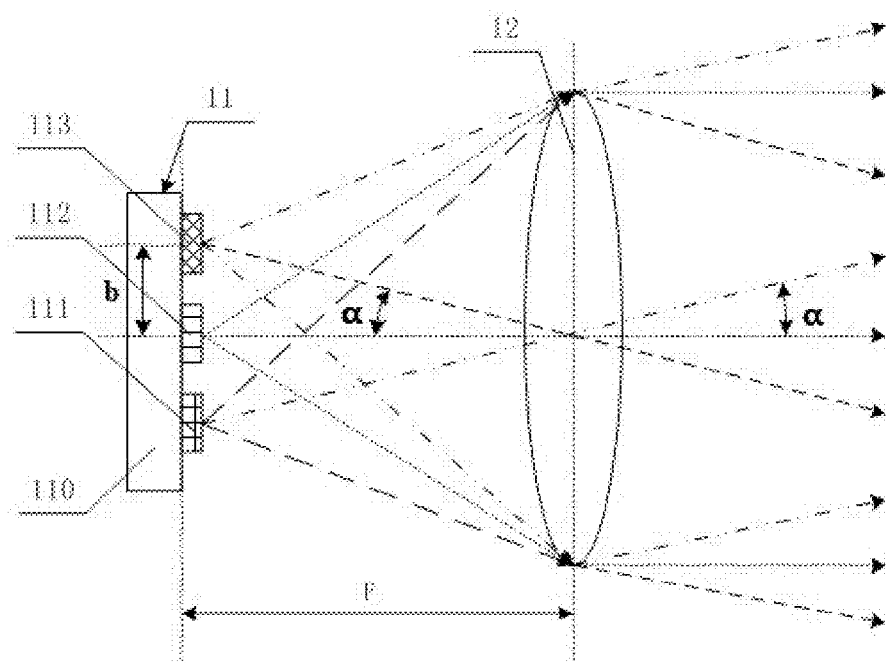
FIG. 5 illustrates a schematic view of optical paths of a pre-collimator according to above exemplary embodiments of the disclosure.

FIG. 5 illustrates a schematic view of optical paths of a pre-collimator according to above exemplary embodiments of the disclosure. As illustrated in FIG. 5, by taking a condition in which a lens having a focal length of F is used to function as the pre-collimator 12 as an example, light-emitting devices of three colors are provided on the lamp bar 110, and all are located on a focal plane which is a plane parallel to the lens and pass through a focus (i.e., focal point) of the lens. By way of example, as illustrated, the green light-emitting device 112 is located at a the focus of the lens, the blue light-emitting device 113 is located on the focal plane at a side thereof deviating from the green light-emitting device 112 (i.e., an upper side in the vertical direction as illustrated) with a distance 'b' from the green light-emitting device 112, and the red light-emitting device 111 is located on the focal plane at the other side thereof deviating from the green light-emitting device 112 (i.e., a lower side in the vertical direction as illustrated) also with a distance 'b' from the green light-emitting device 112. As such, after being processed by pre-collimation by the lens 12, all green light beams propagate in a same direction, i.e., a direction perpendicular to a principal plane of the lens (i.e., a direction parallel to a principal optic axis of the lens, as illustrate by relatively dense dotted line), and all red light beams propagate in a same direction, with an angle between the red light beams and the green light beams having a value being equal to α (as illustrated by dot-and-dash line, since red light beams essentially propagates to deflect upwards relative to the direction of the principal optic axis of the lens, i.e., it is then referred to as "red light beams propagate to deflect upwards at an angle 'α' relative to the direction of the principal optic axis of the lens (or to deflect at an angle '+α' relative to the direction of the principal optic axis of the lens)"; and all blue light beams propagate in a same direction, with an angle between the blue light beams and the green light beams having a value also being equal to α (as illustrated by relatively sparse dotted line, since blue light beams essentially propagate to deflect downwards relative to the direction of the principal optic axis of the lens, i.e., it is then referred to as "blue light beams propagate to deflect downwards at an angle 'α' relative to the direction of the principal optic axis of the lens (or to deflect at an angle '−α' relative to the direction of the principal optic axis of the lens)"), and the blue light beams and the red light beams are symmetric about the optical axis of the lens. As such, the pre-collimator 12 transmits the single-colored light beams of each color at a same angle to be incident onto the light-incident portion 13, but light beams of different colors are incident onto the light-incident portion 13 at different incidence angles (here plus or minus signs of the angles are taken into consideration; specifically, for example, aforementioned angles "+α" and "−α" are considered to be different from each other due to respective different signs, although they have the same absolute value). A focal length of the lens is labeled by "F" as illustrated, and it can be known depending on geometrical relationship that:

$$\tan \alpha = b/F \qquad (1)$$

As illustrated in FIG. 4, the light-incident surface of the light-incident portion 13 fits tightly against the light-emergent surface of the pre-collimator 12 (more specifically, the light-emergent surface of the pre-collimator 12 and the light-incident surface of the light-incident portion 13 have the same shape and sizes, and fit with and abut against each other perfectly, as illustrated), and a surface of the light-incident portion 13 opposite to the light-incident surface thereof (i.e., the inclined surface of the light-incident portion 13 abutting against the inclined side surface of the substrate 10, as set forth above) is provided to be a wedge reflective surface, such that light beams which exit the pre-collimator 12 and in turn propagate into the light-incident portion 13 may enter the light guide device by one or more reflections at the wedge reflective surface. According to the principle of light reflection, since angles at which the red light beams, the green light beams and the blue light beams are incident onto the light-incident portion 13 respectively are different from one another, then, with the reflection of the wedge reflective surface, respective angles at which light beams of different colors enter the light guide device are different from one another; however, since the single-colored light beams of each color are incident onto and enter the light-incident portion 13 in parallel to one another, then, the single-colored light beams of each color enter the light guide device at one and the same angle.

According to practical requirements on optical paths, additionally or alternatively, the surface of the light incident portion 13 opposite to the light-incident surface thereof is for example set to be a combinational structure between a wedge reflective surface and a reflective plane surface, e.g., such that the light source device meets requirements of various structural forms and conform to requirements of various application scenes.

As illustrated in FIG. 4, the light guide device 2 of embodiments of the disclosure specifically comprises a light guide device 21, a plurality of light-emergent components 22, and filling layer 23. By way of example, the light guide plate 21 is provided on the substrate 10, and for example extends in a horizontal direction from the light-incident portion 13, and is configured to transmit the plurality of single-colored light beams by total reflection from the light-incident portion 13 towards the plurality of light-emergent components 22; and the plurality of light-emergent components 22 are for example arranged in a matrix at a light emergent surface of the light guide plate 21, and are configured to function as a plurality of light-extracting portions disposed on the light-emergent surface of the light guide plate 21 to guide the plurality of single-colored light beams transmitted within the light guide plate 21 to exit at one and the same collimation angle at positions of the plurality of light-extracting portions (i.e., it is defined as an angle between emergent light beams collimated at positions of the plurality of the light-extracting portions and a normal of a horizontal plane, i.e., a diffraction angle of emergent light beams collimated at positions of the plurality of the light-extracting portions, which angle is equal to zero in a condition that the emergent light beams are collimated completely and perfectly); and the filling layer 23 is disposed on the light-emergent surface of the light guide plate 21 and covers the plurality of light-emergent components 22, and is configured to implement a transmission of the light beams in the light guide plate 21 by total reflection at an interface where the filling layer 23 adjoins and contacts the light guide plate 21 (and the light-incident portion 13); in other words, the light beams propagating in the light guide plate 21 may merely exit through the plurality of light-emergent components 22, rather than exiting from the surface of the light guide plate 21 abutting tightly against the filling layer 23. A refractive index of each of the substrate 10 and the filling layer 23 is smaller than a refractive index of the light guide plate 21, i.e., the refractive index of the light guide plate 21 is larger than the refractive index of each of the two film layers contacting with the light guide plate 21, such that a total reflection of the light beams transmitted within the light guide plate 21 may occur on a contact surface between the light guide plate 21 and the substrate 10 and another contact surface between the light guide plate 21 and the filling layer 23, and the total reflection may reflect the light beams incident onto these contact surfaces back towards the inside of the light guide plate 21. In embodiments of the disclosure, the plurality of light-emergent components 22 may for example specifically comprise a plurality of light-extracting blocks arranged in a matrix, with a refractive index of each of the plurality of light-extracting blocks being larger than or equal to a refractive index of the light guide plate 21, such that the plurality of light-extracting blocks function as the plurality of light-emergent components on the light emergent surface of the light guide plate 21 respectively, i.e., the plurality of light-emergent components are formed by the plurality of light-extracting blocks, and the light beams transmitted within the light guide plate 21 may be incident onto respective pixels of the display panel at one and the same collimation angle at positions of individual ones of the plurality of light-emergent components, respectively (for example implemented by following settings, wherein, an orthogonal projection of each of the plurality of light-emergent components on the display panel at least partially overlaps with respective pixel, more specifically, for example orthogonal projection of each of the plurality of light-emergent components on the display panel is completely aligned with the respective pixel). During practical implementation, the light guide plate and the plurality of light extracting blocks are for example prepared with one and the same material, and they may specifically be prepared as an integral structure with one and the same material. By way of example, the plurality of light-emergent components are processed at the surface of the light guide plate by relevant processes of the art; and in such conditions, then the refractive index of each of the light extracting blocks is equal to the refractive index of the light guide plate 21. Moreover, the light guide plate of the light guide device and the light-incident portion of the light source device are for example prepared respectively by one and the same material, and are for example provided as an integral structure. In a specific example, for example, the light guide plate 21 and the light-incident portion 13 are directly formed integrally (e.g., a side (e.g., a left lateral side) of the light guide plate is formed into a light-incident structure having a wedge reflective surface), or are formed individually and then bonded with each other into an integral structure.

In embodiments of the disclosure, optical paths are for example designed according to the grating equation. As illustrated in FIG. 4, according to geometrical relationships $\theta+\varepsilon=90°$, $\gamma+\varepsilon+\beta=90°$, then there exists following equation:

$$\gamma=\theta-\beta$$

According to geometrical relationships $\theta+\varepsilon=90°$, $\varepsilon=\beta+\alpha$ or $\varepsilon=\beta-\alpha$ (specifically, based on FIG. 5, as to incident blue light beams which originates from blue light-emitting device(s) 113 and are then incident onto the wedge reflective surface (the blue light beams propagate to deflect downwards at an angle '$\alpha$' relative to the principal optical axis of the lens, i.e., to deflect at an angle '$-\alpha$' relative to the direction of the principal optic axis of the lens, as set forth above), $\varepsilon=\beta-\alpha$; as to incident red light beams which originates from red light-emitting device(s) 111 and are then incident onto the wedge reflective surface (the red light beams propagate to deflect upwards at an angle '$\alpha$' relative to the principal optical axis of the lens, i.e., to deflect at an angle '$+\alpha$' relative to the direction of the principal optic axis of the lens, as set forth above), $\varepsilon=\beta+\alpha$; and as to incident green beams, since they propagate in parallel to the direction of the principal optic axis of the lens, i.e., $\alpha=0$, then $\varepsilon=\beta$), there exists following equation:

$$\theta=90°-\varepsilon=90°-\beta+\alpha, \text{ or } \theta=90°-\beta-\alpha,$$

then, $$\gamma=\theta-\beta=90°-2\beta-\alpha, \text{ or } \gamma=\theta-\beta=90°-2\beta+\alpha \qquad (2)$$

Please be noticed that, β is a constant which functions as an angle between the wedge reflective surface of the light-incident portion 13 and a horizontal plane, ε is a variable which functions as an angle between incident light beams and the wedge reflective surface (i.e., an incidence angle of the incident light beams at the wedge reflective surface), and γ is a variable which functions as an angle between light beams and the normal of the light emergent surface (i.e., horizontal plane thereof) of the light guide plate 21.

When the light beams propagate in the light guide plate, provided that the refractive index of the light guide plate 21 is $n_1$ and the refractive indices of the substrate 10 and the filling layer 23 are both $n_2$, since a total reflection occurs at each of an interface where the light guide plate 21 adjoins and contacts the substrate 10 and another interface where the light guide plate 21 adjoins and contacts the filling layer 23, then there exists following equation on the basis of total reflection condition:

$$n1 \sin \gamma = n2,$$

Therefore, a critical angle of total reflection '$\gamma_0$' at upper and lower surfaces of the light guide plate (i.e., a contact surface of the light guide plate 21 with the filling layer 23, and another contact surface of the light guide plate 21 with the substrate 10) is:

$$\gamma_0 = \arcsin(n_2/n_1) \quad (3)$$

And in order to ensure that total reflection of the light beams may occur at both upper and lower surfaces of the light guide plate, it is required that:

$$\gamma \geq \gamma_0 = \arcsin(n_2/n_1) \quad (4)$$

In theory, as to a structure which is formed by the plurality of light-emergent components 22 and the light guide plate 21 cooperating with each other and is similar to a grating coupler such that it is configured to guide light beams therein to exit at the plurality of light-emergent components 22 being contiguous with the light guide plate 1, a diffraction angle γ' of grating for an 'm' order diffraction is determined by a grating period Λ, a wavelength λ of incident light beams, and an incidence angle γ of incident light beams, collectively; and given the preconditions that both the plurality of light-emergent components and the light guide plate use one and the same material and the grating period Λ is fixed in embodiments of the disclosure, then there exists following equation:

$$\sin \gamma - \sin \gamma' = m\lambda/\Lambda \quad (m=0, \pm1, \pm2, \ldots) \quad (5)$$

Please be noticed that, the diffraction angle γ' is an angle between emergent light beams passing through the plurality of light-emergent components 22 and the normal of horizontal plane; and as to a collimated exiting of the emergent light beams perpendicular to the horizontal plane in an ideal condition as expected, e.g., as illustrated in FIG. 4, γ'=0, and therefore there exists following equation:

$$\sin \gamma = m\lambda/\Lambda \quad (m=0, \pm1, \pm2, \ldots) \quad (6)$$

According to aforementioned formulas (1), (2), (4) and (6), a distance b between adjacent ones of single-colored light-emitting devices having different colors respectively, and an angle β between the wedge reflective surface and the horizontal plane, can be calculated, and then a design of the light source device is carried out depending on the distance b and the angle β. By way of example, with an analysis on optical paths as above, it may be seen that, by an adjustment of relative positions among the light-emitting devices of three colors (i.e., the distance b among adjacent ones of single-colored light emitting devices having different colors respectively), e.g., then adjacent light beams having different colors (wavelengths) are incident onto the light guide structure at respective angles a different from one another (in other words, said angle α among adjacent light beams having different colors may vary depending on the distance b among adjacent ones of single-colored light emitting devices having different colors respectively); and by an adjustment of the distance b among adjacent ones of single-colored light emitting devices having different colors respectively and the wedge angle β of the wedge reflective surface, for example it can be implemented that light beams having different colors (wavelengths) exit at one and the same collimation angle at positions of the plurality of light-emergent components of the light guide structure.

In embodiments of the disclosure, in consideration that red light beams have a relatively large wavelength, then for example it is required that a relatively small incidence angle may be set for the red light beams; and blue light beams have a relatively small wavelength, then for example it is required that a relatively large incidence angle may bet set for the blue light beams, so that light beams having different wavelengths all exist at the collimation angle. In practical implementation, by a precise design with a professional optical simulation software, then, an angle between emergent light beams passing through the plurality of light-emergent components 22 and the normal of horizontal plane (i.e., the diffraction angle γ') may also for example be set to exit essentially in a deflected condition (for example, being deflected towards positions of human eye of an observer), rather than being set to exit completely/perfectly perpendicular to the horizontal plane; as such, an light-emergent direction of each pixel can be determined by a relative relationship between specific position of the pixel and position of the human eye; and since the light-emergent direction of each pixel is fixed, then the diffraction angle γ' for each pixel is also fixed.

Figure 6:
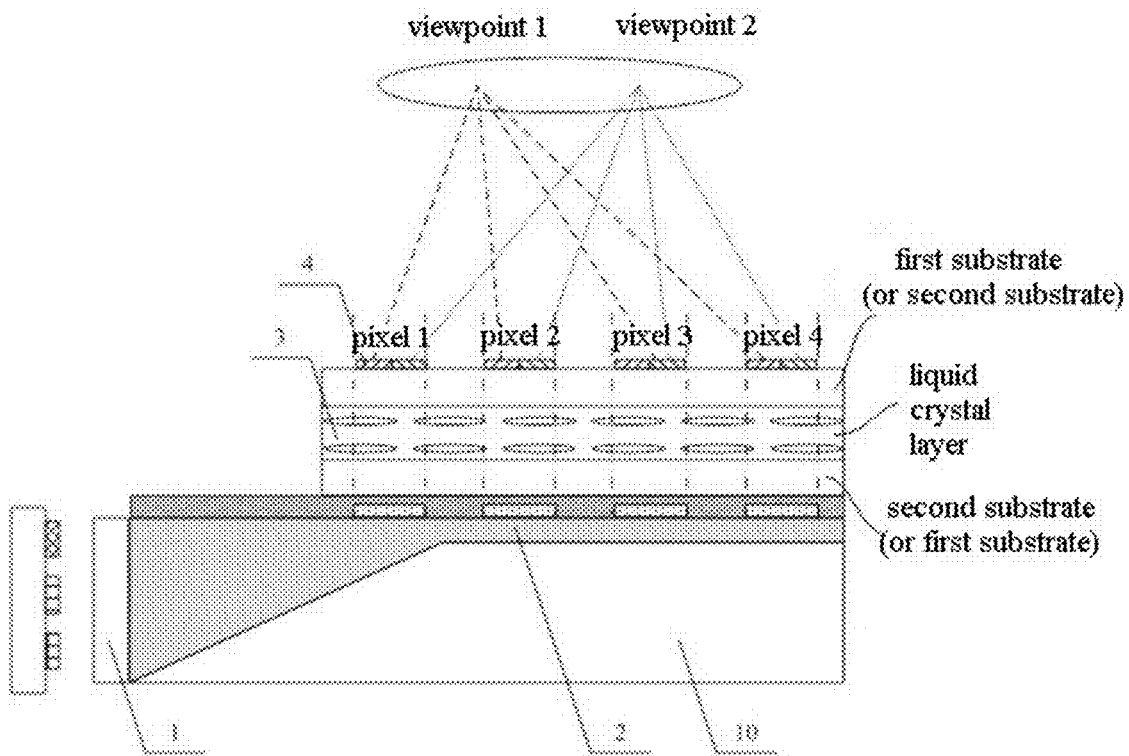
FIG. 6 illustrates a schematic view of the near-eye display device according to above exemplary embodiments of the disclosure.

FIG. 6 illustrates a schematic view of the near-eye display device according to above exemplary embodiments of the disclosure. As illustrated in FIG. 6, a main body structure of the near-eye display device for human eye of an observer comprises: a light source device 1, a light guide device 2, a display panel 3, and a light-splitting device 4. The display panel 3 is for example specifically in the form of a liquid crystal panel without any color filter layer, and is specifically for example provided on the light-emergent surface of the light guide device 2 (i.e., a surface of the filling layer 23 facing away from the light guide plate 21 as illustrated), and is configured to control both color and grayscale of a respective emergent light beam of each of the plurality of pixels within the one-frame display period; the light-splitting device 4 is located on the light-emergent side of the display panel, specifically for example on the light-emergent surface of the display panel 3 facing away from the light guide device 2, and is configured to guide the respective emergent light beam of each of the plurality of pixels to propagate towards a plurality of viewpoints of the human eye of the observer respectively, by splitting the respective emergent light beam of each of the plurality of pixels. The main body structure of the display panel 3 comprises a first substrate and a second substrate provided opposite to each other, and a liquid crystal layer interposed between the first substrate and the second substrate. The first substrate for example comprises a plurality of gate lines and a plurality of data lines, the plurality of gate lines and the plurality of data lines being arranged in the first substrate to perpendicularly intersect with each other and both being arranged orthogonally to the normal of the light-emergent surface (i.e., horizontal plane) of the light guide plate 21, so as to define a plurality of pixels arranged in a matrix, each pixel being provided with a thin film transistor (abbreviated as TFT) and a respective pixel electrode. The second substrate comprises a black matrix and a common electrode. Neither the first substrate nor the second substrate has any color filter layer. Since in embodiments of the disclosure, the light source device which emits the red light beams, the green light beams and the blue light beams respectively is adopted, rather than a single-colored light-beam source of merely one color (e.g., a white light emitting device), then it is not required that the display panel of the embodiments is configured to produce a color-filter structure of different colors. In practical implementation, the display panel according to embodiments of the disclosure is for example in the form of relevant structural form.

In embodiments of the disclosure, a position of each of the plurality of light-emergent components formed in the light guide device is set to be in one-to-one correspondence with a position of each pixel of the display panel (here the expression "in one-to-one correspondence with" means that light beams exiting the light-emergent components are then transmitted to respective pixels; for example, as a specific embodiment, positions of the plurality of light-emergent components and positions of respective pixels of the display panel are arranged to be aligned with each other, i.e., an orthogonal projection of each of the plurality of light-emergent components on the display panel at least partially overlaps with a respective pixel of the display panel). As a more specific example, an area of each of the light-emergent components is the same as an area of the active area (also abbreviated as 'AA'; i.e., the effective display area) of a respective pixel, facilitating an implementation that an orthogonal projection of each of the plurality of light-emergent components on the display panel completely/perfectly overlaps with the respective pixel on the display panel. As such, light beams which exit at one and the same collimation angle at positions of the plurality of light-emergent components may for example all enter the active area of respective pixels, and the light beams in turn pass through the display panel, so as to implement a control on specific colors thus displayed on the display panel.

Figure 7:
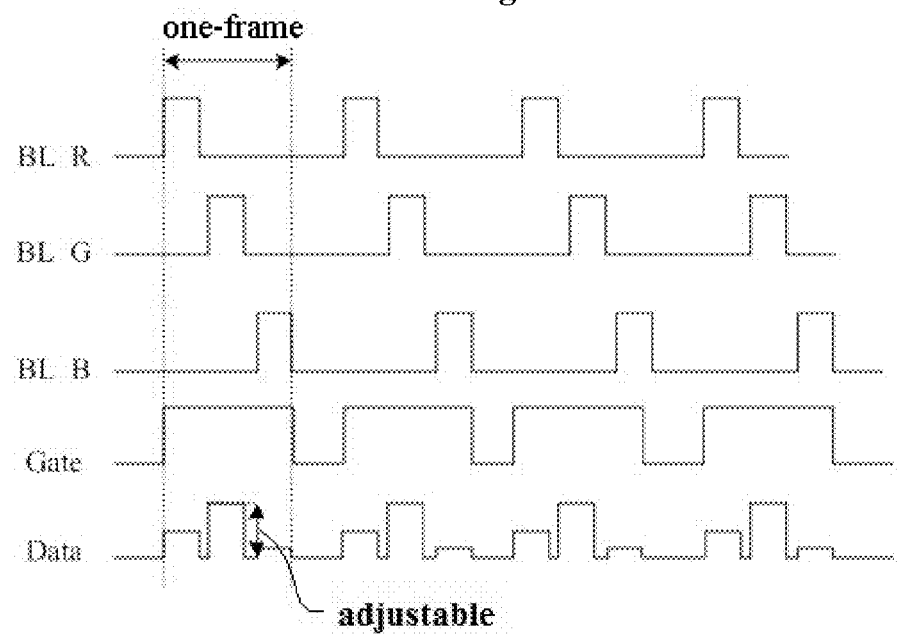
FIG. 7 illustrates a schematic diagram of operation principle of the near-eye display device according to above exemplary embodiments of the disclosure.

FIG. 7 illustrates a schematic diagram of operation principle of the near-eye display device, shown in timing sequences, according to above exemplary embodiments of the disclosure. As illustrated in FIG. 7, the light-emitting device comprises a red light-emitting device (i.e., a backlight device of RED color, abbreviated as BL R), a green (G) light-emitting device (i.e., a backlight device of GREEN color, abbreviated as BL G), and a blue light-emitting device 113 (i.e., a backlight device of BLUE color, abbreviated as BL B); and the display panel comprises the plurality of gate lines configured to output Gate signals and the plurality of data lines configured to output Data signals. And the one-frame display period of the display panel (i.e., a duration of the one-frame display panel is defined such that light beams of different colors emitted during different light-emitting time periods are not distinguishable by human eye of the observer) is divided into three light-emitting time periods, i.e., a first light-emitting time period, a second light-emitting time period, and a third light-emitting time period (e.g., they are identical in respective durations), in each of which a light-emitting device of a single color emits light, and three different single-colored light-emitting device which emit light respectively in different light-emitting time periods have identical intensity of emergent light therefrom respectively, which intensity is constant in respective light-emitting time period of each single-colored light-emitting device. Specifically, as illustrated in FIG. 7, in the first light-emitting time period, the red light-emitting device emits red light beams which then pass through the pre-collimator and light-incident portion and enter the light guide plate within which the red light beams are transmitted by total reflection and are subsequently incident onto respective pixels of the display panel at positions of the plurality of light-emergent components at the collimation angle, and meanwhile, grayscale displayed by each of the pixels within the first light-emitting time period is adjusted, by controlling the pixels to display red color at a first grayscale as instructed by the data signals of the plurality of data lines of the display panel. In the second light-emitting time period, the green light-emitting device emits green light beams which then pass through the pre-collimator and light-incident portion and enter the light guide plate, within which the green light beams are transmitted by total reflection and are subsequently incident onto respective pixels of the display panel at positions of the plurality of light-emergent components at the collimation angle, and meanwhile, grayscale displayed by each of the pixels within the second light-emitting time period is adjusted, by controlling the pixels to display green color at a second grayscale as instructed by the data signals of the plurality of data lines of the display panel. In the third light-emitting time period, the blue light-emitting device emits blue light beams which then pass through the pre-collimator and light-incident portion and enter the light guide plate, within which the blue light beams are transmitted by total reflection and are subsequently incident onto respective pixels of the display panel at positions of the plurality of light-emergent components at the collimation angle, and meanwhile, grayscale displayed by each of the pixels within the third light-emitting time period is adjusted, by controlling the pixels to display blue color at a third grayscale as instructed by the data signals of the plurality of data lines of the display panel. As such, each pixel of the display panel displays red color at the first grayscale as adjusted, during the first light-emitting time period, displays green color at the second grayscale as adjusted, during the second light-emitting time period, and displays blue color at the third grayscale as adjusted, during the third light-emitting time period. As such, within the one-frame display period, specific colors presented by each pixel consist of red color, green color, and blue color presented sequentially at different respective grayscales respectively. In relevant art, in a display panel, red sub-pixels, green sub-pixels and blue sub-pixels are formed by utilizing a color-filter layer; and more specifically, by controlling grayscales of light beams of a red sub-pixel, a green sub-pixel and a blue sub-pixel, specific color of a respective pixel is adjustable, therefore three sub-pixels are required to determine/form specific color of a respective pixel. In embodiments of the disclosure, merely one sub-pixel is required to present a desired color for a respective pixel, by displaying red color, green color and blue color, in a time-division manner, within an one-frame display period (the duration of the one-frame display panel is defined such that light beams of different colors emitted during different light-emitting time periods are not distinguishable by human eye of the observer) so as to form the color of a respective pixel. Therefore, specifically, as compared with a relevant technical structure, an improvement of the embodiments of the disclosure lies in that, light beams of different colors propagate in a time-division manner to each pixel of the plurality of pixels of the display panel and pass through said each pixel at respective grayscale thus adjusted, within an one-frame display period, so as to implement that a single sub-pixel in said each pixel is utilized to present a desired color for said each pixel within said one-frame display period, then, an area of each pixel in the plurality of pixels in embodiments of the disclosure is ⅓ of an area of a pixel in relevant art, therefore there is a 3 times increase in display resolution.

In embodiments of the disclosure, it is implemented that each pixel of the plurality of pixels presents different colors within said one-frame display period, for example, by an adjustment of magnitudes of voltage of a respective data signal inputted by the plurality of data lines and applied to each pixel of the plurality of pixels, it is implemented that different grayscales to be displayed by light beams of different colors to be transmitted through each pixel of the plurality of pixels are instructed by the respective data signal. By way of example, during the first light-emitting time period, the respective data signal has a first magnitude of voltage; during the second light-emitting time period, the respective data signal has a second magnitude of voltage; and during the third light-emitting time period, the respective data signal has a third magnitude of voltage. The first magnitude of voltage, the second magnitude of voltage, and the third magnitude of voltage may for example be chosen to be the same as one another, or alternatively may be chosen to be different from one another, and specific choice in this connection should be determined depending on colors and grayscales both of which are desired to be presented. In other words, magnitudes of voltage of data signals across the display panel are adjustable during the one-frame display period, and in each light-emitting time period, respective magnitudes of voltage are applied to individual ones of the plurality of pixels through the plurality of data lines, and a combination of different magnitudes of voltage corresponds to different colors and different grayscales of each pixel of the plurality of pixels within the one-frame display period; as such, a combination of the first magnitude of voltage, the second magnitude of voltage and the third magnitude of voltage as applied during the first light-emitting time period, the second light-emitting time period, the third light-emitting time period respectively may control both colors and grayscales of emergent light beams of each pixel of the plurality of pixels within said one-frame display period.

As illustrated in FIG. 6, the light-splitting device 4 according to embodiments of the disclosure is provided on the light-emergent surface of the display panel 3 facing away from the light guide device 2 and is configured to split the light beams, which originate from each of the plurality of pixels, into a plurality of sub-beams propagating towards a plurality of viewpoints of the human eye of the observer respectively. In embodiments of the disclosure, the light-splitting device for example comprises a plurality of light-splitters arranged in a matrix, a position of each of the plurality of light-splitters being in one-to-one correspondence with a position of a respective one of the plurality of pixels of the display panel (here the expression "in one-to-one correspondence with" means that light beams exit the plurality of pixels and then are transmitted to respective ones of the plurality of light-splitters; for example, positions of the plurality of light-splitters and positions of respective pixels of the display panel are arranged to be aligned with each other, i.e., an orthogonal projection of each of the plurality of light-splitters on the display panel at least partially overlaps with a respective pixel of the display panel. As a more specific example, an area of each of the plurality of light-splitters is the same as an area of the active area (also abbreviated as 'AA'; i.e., the effective display area) of a respective pixel of the display panel, facilitating an implementation that an orthogonal projection of each of the plurality of light-splitters on the display panel completely/perfectly overlaps with the respective pixel on the display panel; and by way of example, pixels at different positions on the display panel correspond to respective light-splitters having different structures, and are configured to guide emergent light beams exiting the plurality of pixels to pass through the plurality of light-splitters and in turn to propagate towards a plurality of viewpoints of the human eye of the observer, respectively. Specifically, each of the plurality of light-splitters comprises a plurality of sub-splitters arranged regularly (for example the plurality of sub-splitters are arranged in the same way as a way in which N viewpoints are expected to be arranged in a "monocular depth of field" solution having a plurality of viewpoints (e.g., N viewpoints)), each sub-splitter being configured to transmit a respective one of a plurality of sub-beams of emergent light beams exiting the plurality of pixels towards a respective one of the plurality of viewpoints of the human eye. By way of example, as far as a "monocular depth of field" solution having four viewpoints is concerned, each of the plurality of splitters comprises four sub-splitters which are arranged in the same way as a way in which four viewpoints are arranged as illustrated in FIG. 1 and are located at four positions respectively corresponding to respective pixels, and sub-splitters at different positions vary in their structures such that emergent light beams exiting sub-splitters at different positions may propagate towards different viewpoints of the human eye. Four sub-splitters are provided corresponding to respective positions of each pixel, that is to say, each pixel is divided into four viewpoint pixels, then, light beams projected onto each of the plurality of light-splitters of the light-splitting device 4 are subsequently split by the plurality of sub-splitters of each light-splitter into sub-beams propagating towards respective viewpoint pixels, then each sub-beam may function as a respective one of the plurality of sub-beams directing towards one of the viewpoints of the human eye; in other words, a first sub-splitter of the plurality of sub-splitters transmits a light beam exiting a first viewpoint pixel of a respective pixel towards a first viewpoint of the plurality of viewpoints of the human eye, a second sub-splitter of the plurality of sub-splitters transmits a light beam exiting a second viewpoint pixel of a respective pixel towards a second viewpoint of the plurality of viewpoints of the human eye, a third sub-splitter of the plurality of sub-splitters transmits a light beam exiting a third viewpoint pixel of a respective pixel towards a third viewpoint of the plurality of viewpoints of the human eye, and a fourth sub-splitter of the plurality of sub-splitters transmits a light beam exiting a fourth viewpoint pixel of a respective pixel towards a fourth viewpoint of the plurality of viewpoints of the human eye. And specific structure of each sub-splitter is for example designed depending on a position thereof, and a relative position of a respective pixel of the sub-splitter with reference to the human eye, so as to implement that sub-beams exiting different viewpoint pixels of each pixel propagate towards respective viewpoints of the human eye. As such, in practice, an equivalent single-pixel multi-viewpoint solution (i.e., here the "monocular depth of field" solution having four viewpoints) is implemented, in which each pixel is divided into four viewpoint pixels and each viewpoint pixel is configured to guide partial light beams transmitted therethrough to function as a respective sub-beam propagating towards a respective one of the plurality of viewpoints of the human eye (and since four viewpoints of the human eye are arranged to be spaced apart from one another, then light beams projected onto each of the plurality of pixels are divided into four sub-beams), by providing each of the plurality of light-splitters of the light-splitting device 4 in one-to-one correspondence with a respective pixel of the plurality of pixels to comprise four sub-splitters located respectively corresponding to four positions of the respective pixel, without essentially changing specific structure of each of the plurality of pixels of the display panel. As such, specific light-emergent directions of emergent light beams exiting each pixel are controlled by a respective light-splitter, such that a monocular multi-viewpoint display is implemented, without changing specific structure and size of each pixel.

In practical implementation, each of the plurality of light-splitters is for example a nano light splitter; and each of the plurality of sub-splitters which constitute each of the plurality of light-splitters is for example in the form of convex lens structure, e.g., nano micro-lens, and then it converges light beams transmitted therethrough in a preset direction, by utilizing a convergence effect of the convex lens structure for light beams, such that partial light beams passing through each sub-splitter (i.e., each sub-beam) may propagate towards a respective one of the plurality of viewpoints of the human eye, and display brightness may also be increased for example by the convergence effect of individual ones of the plurality of sub-splitters for respective sub-beams while controlling directions of respective sub-beams. Alternatively, each of the plurality of sub-splitters is for example in the form of nano micro-prism structure, and then directions of respective sub-beams of the plurality of sub-splitters are controlled with the refraction effect of micro-prism, such that their respective sub-beams propagate towards respective viewpoints of human eye. The nano light splitter, the nano micro-lens, and the nano micro-prism are all known optical components in the art, without being repeated herein any more.

By way of example, it can be seen from above depictions of embodiments of the disclosure that, in embodiments of the disclosure, by providing a light source device configured to generate a plurality of single-colored light beams, a light guide structure configured to guide light beams to be transmitted by total reflection and to exit at one and the same collimation angle at positions of individual ones of the plurality of light-emergent components, a display panel configured to adjust both color and grayscale of emergent light beams of the plurality of pixels thereof, and a light-splitting device configured to implement a single-pixel multi-viewpoint solution by using a plurality of sub-splitters contained therein to control light-emergent directions of respective sub-beams, not only a near-eye display of a "monocular depth of field" solution having a plurality of viewpoints solution is implemented, but also the display resolution is significantly/drastically enhanced. Specifically, by adjusting positional relationship among a red light-emitting device, a green light-emitting device and a blue light-emitting device, light beams of different colors may be incident onto the light guide device at respective preset angles. By providing a light guide plate and a plurality of light-emergent components, for example the light beams may be transmitted within the light guide plate by total reflection, and exit at essentially one and the same collimation angle at preset positions of individual ones of the plurality of light-emergent components. By adjusting color and grayscale both presented by each pixel with the display panel (for example adjusting different magnitudes of voltage of data signal applied onto individual ones of the plurality of pixels through the plurality of data lines within said one-frame display period), and by controlling different light emergent directions of light beams individually and separately with a plurality of sub-splitters contained in the light-splitting device, then light beams exiting each pixel are split into a plurality of sub-beams propagating towards the plurality of viewpoints of the human eye of the observer, respectively, such that a monocular multi-viewpoint display is implemented, and therefore there is a 3 times increase in display resolution.

Figure 8:
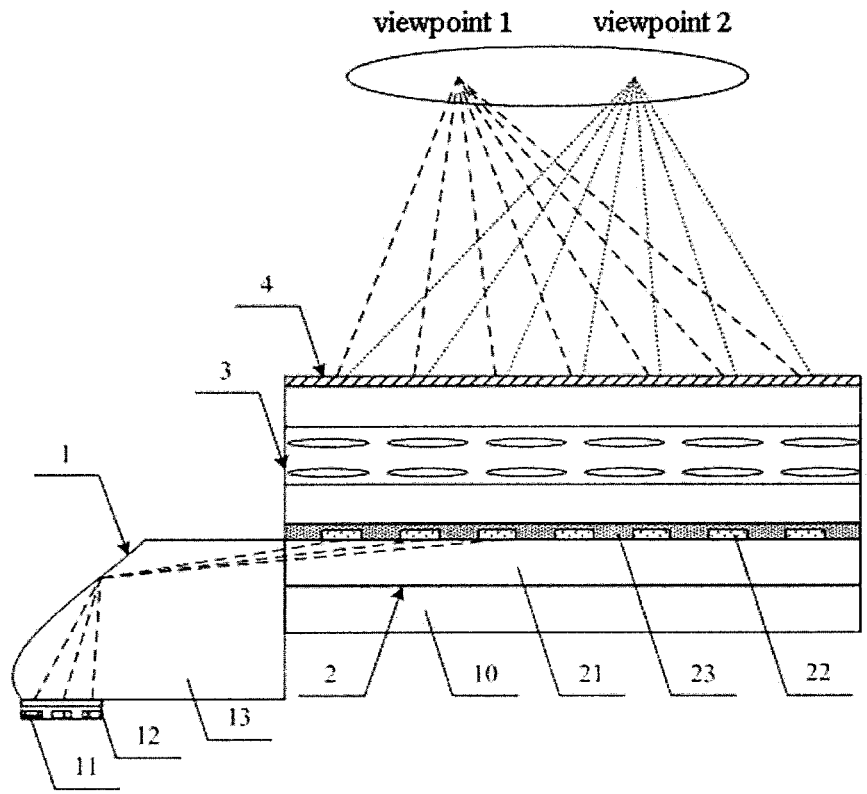
FIG. 8 illustrates a schematic structural view of a near-eye display device according to some other exemplary embodiments of the disclosure.

According to some other embodiments of the disclosure, FIG. 8 illustrates a schematic structural view of a near-eye display device according to some other exemplary embodiments of the disclosure. As illustrated in FIG. 8, a main body structure of the near-eye display device comprises: a light source device 1, a light guide device 2, a display panel 3 and a light-splitting device 4. The display panel 3 and the light-splitting device 4 have their respective structures and operation principles the same as those in above embodiments. The light guide device comprises a light guide plate 21, a plurality of light-emergent components 22, and a filling layer 23 which are stacked on the substrate and overlap with one another, and their respective structures and operation principles are the same as those in above embodiments. The light source device comprises a light emitting device 11, a pre-collimator 12, and a light-incident portion 13, and the light emitting device 11 and the pre-collimator 12 have their respective structures and operation principles the same as those in above embodiments. However, there still exist some differences, lying in that specific arrangements of the light emitting device 11 and the pre-collimator 12 are different from those in above embodiments; specifically, although the light source device 11 is still a side-lit light source (i.e., being arranged on a side portion of the light guide device 2 in a direction orthogonal to a normal direction of the display panel 3 of the near-eye display device; in other words, being arranged on a lateral side of the light guide device 2 as illustrated), the light emitting device in the light source device 1 for example comprises a plurality of single-colored light-beam sources arranged in the direction orthogonal to the normal direction of the display panel 3 of the near-eye display device, i.e., the horizontal direction as illustrated (rather than being arranged in the vertical direction as mentioned in above embodiments); and the light-incident portion 13 of embodiments of the disclosure is in a form of a parabolic reflective surface structure, rather than the wedge reflective surface as mentioned in above embodiments of the disclosure. More specifically, the light source device 1 of embodiments of the disclosure specifically for example comprises the light-emitting device 11, the pre-collimator 12 and the light-incident portion 13, the light emitting device 11 comprises the plurality of single-colored light-beam sources which are provided adjacent to one another (even tightly abutting against one another, or merely spaced apart from one another at a gap to form a matrix), and the plurality of single-colored light-beam sources are for example arranged in the direction orthogonal to the normal direction of the display panel 3 of the near-eye display device, as illustrated, i.e., in the horizontal direction as illustrated (rather than being in the vertical direction as mentioned in above embodiments of the disclosure) and configured to emit a plurality of single colored light beams having different colors sequentially in one display period; the pre-collimator 12 is provided on a light-emergent side of the light-emitting device 11 (for example being aligned with the plurality of single-colored light-beam sources, as illustrated), and also provided in the horizontal direction as illustrated, i.e., being spaced apart from the plurality of single-colored light beam sources of the light emitting device 11 at a uniform gap, as illustrated, and is configured to carry out a pre-collimating process on the single-colored light beams having different colors from one another which are emitted by the light-emitting device 11, and in turn to guide individual ones of the single-colored light beams to be incident onto the light-incident portion 13 at respective angles (e.g., preset angles). The light-incident portion 13 is provided on a light-emergent side of the pre-collimator 12 (e.g., a light-emergent surface of the pre-collimator 12 abutting tightly against a light-incident surface of the light-incident portion 13, as illustrated in FIG. 8) and between the pre-collimator 12 and the light guide device 2 (and the pre-collimator 12 and the light guide device 2 are for example orthogonal to each other and spaced apart from each other), and is configured to transmit individual ones of the plurality of single-colored light beams to be incident at respective preset angles onto the light guide device 2, respectively, the light-incident surface of the light-incident portion 13 fits tightly against the light-emergent surface of the pre-collimator 12, and a surface of the light-incident portion 13 opposite to the light-incident surface thereof is provided to be a parabolic reflective surface, such that light beams which exit the pre-collimator 12 and in turn propagate into the light-incident portion 13 may enter the light guide device 2 by one or more reflections at the parabolic reflective surface, more specifically enter the light guide plate 21 of the light guide device 2 (the light guide plate 21 is provided on the substrate 10 by abutting directly against the substrate 10). And a light-emergent surface of the light-incident portion 13 is orthogonal to the horizontal direction, and a side portion of the substrate 10 and a respective side portion of the light guide plate 21 facing towards said side portion of the substrate 10 abut against each other in the vertical direction.

According to the principle of light reflection, since angles at which the red light beams, the green light beams and the blue light beams are incident onto the light-incident portion 13 respectively are different from one another, then, with the reflection of the parabolic reflective surface of the light-incident portion 13, respective angles at which light beams of different colors enter the light guide device are different from one another; however, since the single-colored light beams of each color are incident onto and enter the light-incident portion 13 in parallel to one another, then, the single-colored light beams of each color enter the light guide device at one and the same angle.

According to practical requirements on optical paths, additionally or alternatively, the surface of the light incident portion 13 opposite to the light-incident surface thereof is for example set to be a combinational structure between a parabolic reflective surface and a reflective plane surface, e.g., such that the light source device meets requirements of various structural forms and conform to requirements of various application scenes.

According to still some other embodiments of the disclosure, a specific structure of the near-eye display device thereof is the same as that of the near-eye display device in above embodiments, however, there still exist differences, lying in that, respective intensities of emergent light from the red light-emitting device, the green light-emitting device and the blue light-emitting device of embodiments of the disclosure here are adjustable. In other words, on one hand, respective light intensities of the red light-emitting device, the green light-emitting device and the blue light-emitting device are adjusted; meanwhile, on the other hand, both color and grayscale presented by the pixels are still adjusted by adjustment of signals of data lines of the display panel.

As such, by such a combinational control, requirements of various design scenes and application scenes are met.

The specific structure of such embodiments of the disclosure is the same as that of above embodiments, however, there still exists difference, lying in that, in each light-emitting time period, merely light-emitting device(s) of a single color may emit light, with specific intensity of emergent single-colored light being adjustable. Specifically, in practical implementation, e.g., specific intensities of emergent light beams may be adjusted by adjustment of magnitudes of voltage applied on various LEDs.

Figure 9:
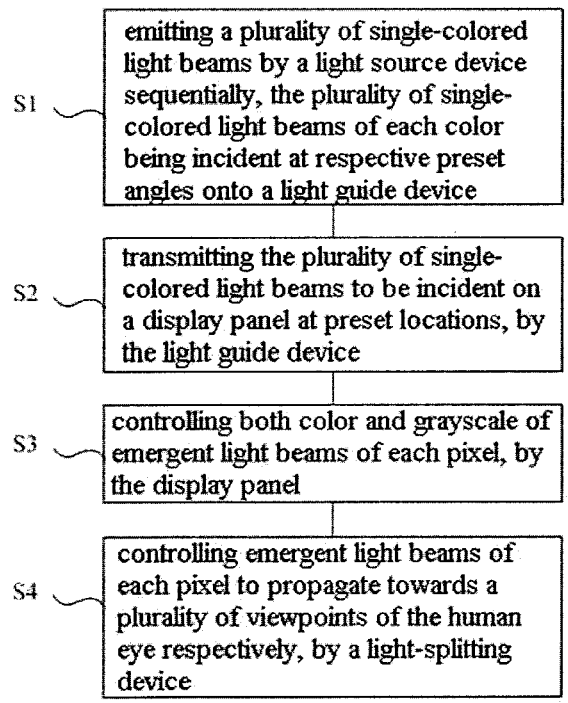
FIG. 9 illustrates a flow chart of a near-eye display method according to an embodiment of the disclosure.

According to yet some other embodiments, based on a technical concept of above embodiments, a near-eye display method for human eye of an observer is provided. FIG. 9 illustrates a flow chart of a near-eye display method according to an embodiment of the disclosure. As illustrated in FIG. 9, the near-eye display method comprises following steps:

S1. emitting a plurality of single-colored light beams by a light source device sequentially(e.g., periodically or non-periodically), the plurality of single-colored light beams being incident angularly (i.e., at respective preset angles) onto a light guide device located on a light-emergent side of the light source device;

S2. receiving and transmitting the plurality of single-colored light beams from the light source device by the light guide device to guide the plurality of single-colored light beams to emit outwards from preset locations (e.g., at light-emergent components on a light-emergent side of the light guide device) and then be incident on a display panel;

S3. controlling, by the display panel located on the light-emergent side of the light guide device and comprising a plurality of pixels, both color and grayscale of emergent light beams generated by the plurality of single-colored light beams which are incident on the display panel 3 and transmitted through the plurality of pixels from the light guide device; and S4. splitting emergent light beams from individual ones of the plurality of pixels into a plurality of sub-beams propagating towards a plurality of viewpoints of the human eye respectively, by a light-splitting device.

And the light source device comprises a light-emitting device, a pre-collimator and a light-incident portion. The step Si specifically comprises:

S11. sequentially emitting the plurality of single-colored light beams having different colors respectively, in a display period, by the light-emitting device;

S12. utilizing the pre-collimator to transmit the plurality of single-colored light beams to be incident onto the light-incident portion at respective predetermined angles (i.e., at respective preset angles); and S13. utilizing a wedge reflective surface or a parabolic reflective surface of the light-incident portion to transmit the plurality of single-colored light beams to be incident angularly onto the light guide device (e.g., being incident onto a side of the light guide device), respectively.

For example, the display period is an one-frame display period, which is split into a plurality of light-emitting time periods (e.g., equally divided into a plurality of light-emitting time periods having one and the same duration respectively); and as to each of the plurality of light-emitting time periods within said one-frame display period, single-colored light beams of a respective one color are emitted.

The light guide device comprises a light guide plate and a plurality of light-emergent components. And the step S2 specifically comprises:

S21. transmitting the plurality of single-colored light beams towards the plurality of light-emergent components in a total-reflection manner by the light guide plate; and S22. guiding the plurality of single-colored light beams, which are transmitted within the light guide plate, by the plurality of light-emergent components to be incident onto individual ones of the plurality of pixels of the display panel at positions of the plurality of light-emergent components which function as light-extracting portions.

The step S3 specifically comprises: implementing a control on both color and grayscale of a respective emergent light beam of each of the plurality of pixels within the one-frame display period, by utilizing a respective data signal applied to said each of the plurality of pixels through a respective data line by the display panel to adjusting grayscale of the respective emergent light beam emitted outwards from said each of the plurality of pixels at different emergent-light durations within the one-frame display period.

The light-splitting device comprises a plurality of light-splitters arranged in a matrix on a light-emergent surface of the display panel, a position of each of the plurality of light-splitters being in one-to-one correspondence with a position of a respective one of the plurality of pixels of the display panel, and the plurality of light-splitters in one-to-one correspondence with respective ones of the plurality of pixels at different positions on the display panel differing in structure thereof from one another. The step S4 comprises:

Splitting the light beams, which originate from each of the plurality of pixels, into a plurality of sub-beams propagating towards a plurality of viewpoints of the human eye of the observer respectively, by a respective one of the plurality of light-splitters of the light-splitting device.

In embodiments of the disclosure, respective structures and operation principles of the light source device, the light guide device, the display panel and the light-splitting device are the same as those in above embodiments, without being repeated herein any more.

According to still yet some other embodiments, based on above technical concept, a virtual/augmented reality apparatus is provided, comprising above near-eye display device. The virtual/augmented reality apparatus is for example a virtual/augmented reality head-mounted display, and may for example alternatively be other device or apparatus having near-eye 3D display functionality.

As compared with relevant art, embodiments of the disclosure have beneficial effects as below: as to the near-eye display device and the near-eye display method according to embodiments of the disclosure, by providing a light source device configured to generate a plurality of single-colored light beams, a light guide structure configured to guide light beams to be transmitted by total reflection and to be incident onto a display panel at preset locations (e.g., at positions of individual ones of the plurality of light-emergent component), the display panel configured to control both color and grayscale of emergent light beams of the plurality of pixels thereof, and a light-splitting device configured to control light-emergent directions of respective sub-beams for example by utilizing a plurality of light-splitters contained therein, not only a "monocular depth of field" near-eye display is implemented, but also the display resolution is significantly/drastically enhanced.

In the description of the embodiments of the present disclosure, it is to be understood that orientation or position relationships indicated by terms "central", "upper", "lower", "front", "rear", "vertical", "horizontal", "top", "bottom", "inside" and "outside" and the like are essentially based on the orientation or position relationship as illustrated in the drawings, merely intended to facilitate describing embodiments of the disclosure and simplifying depictions, rather than indicating or implying that the device or element referred to must have a specific orientation, be constructed and operated in a specific orientation, and thus cannot be interpreted to be a limitation on the embodiments of the present disclosure.

In the description of embodiments of the present disclosure, it should be noted that, unless explicitly stated or defined otherwise, terms such as "mount", "connect", "connection" should be understood in a broad sense, and may for example include a fixed connection, a detachable/removable connection or an integral connection; and may for example comprise a mechanical connection or an electrical connection; and may for example comprise a direct connection or an indirect connection through an intermediate medium, and may be an internal communication of two elements or an interaction of two elements. For those skilled in the art, for example, for those skilled in the art, the specific meanings of the above terms in the present disclosure may be understood according to specific cases.

Although the embodiments disclosed in the present disclosure are as described above, the contents described are merely embodiments adopted for facilitating understanding of the present disclosure, rather than intending to limit the present disclosure. Any modifications and variations may be made in the specific forms and details of implementation by those skilled in the field of embodiments of the present disclosure, without departing from the spirit and scope of the present disclosure, but the scope of the present disclosure is defined by the appended claim.

What is claimed is:

1. A near-eye display device for human eye of an observer, comprising:
a light source device, configured to emit a plurality of single-colored light beams sequentially in a display period;
a light guide device, on a light-emergent side of the light source device, and configured to receive and transmit the plurality of single-colored light beams from the light source device and to guide the plurality of single-colored light beams to emit outwards from a light-emergent side of the light guide device within an one-frame display period, the display period being equal to the one-frame display period;
a display panel, on the light-emergent side of the light guide device and comprising a plurality of pixels, and configured to receive the plurality of single-colored light beams from the light guide device and to control both color and grayscale of emergent light beams generated by the plurality of single-colored light beams which are incident on the display panel and transmitted through the plurality of pixels, and then exit the display panel; and
a light-splitting device, on a light-emergent side of the display panel and configured to split emergent light beams from individual ones of the plurality of pixels into a plurality of sub-beams propagating towards a plurality of viewpoints of the human eye respectively.

2. The near-eye display device according to claim 1, wherein the light source device comprises:
a light-emitting device, comprising a plurality of single-colored light-beam sources configured to sequentially emit the plurality of single-colored light beams having different colors respectively, in the display period; and a pre-collimator and a light-incident portion, the pre-collimator being located on a light-emergent side of the light-emitting device and spaced apart from the plurality of single-colored light-beam sources at a uniform spacing therebetween and configured to transmit the plurality of single-colored light beams to be incident onto the light-incident portion at respective predetermined angles, with the single-colored light beams of each color being incident onto the light-incident portion at a same angle, but light beams of different colors being incident onto the light-incident portion at different incidence angles, and the light-incident portion being located on a light-emergent side of the pre-collimator and configured to transmit the plurality of single-colored light beams to be incident angularly onto the light guide device, respectively.

3. The near-eye display device according to claim 2, wherein the light-emitting device comprises a red light-emitting device, a green light-emitting device and a blue light-emitting device, which are arranged in a vertical direction and spaced apart from one another;

the pre-collimator comprises a lens; and the light-incident portion is provided with a light-incident surface abutting against the pre-collimator and a reflective surface opposite to the light-incident surface, the reflective surface being a wedge reflective surface.

4. The near-eye display device according to claim 1, wherein the light guide device comprises:

a light guide plate on a substrate and configured to transmit the plurality of single-colored light beams from the light source device in a total-reflection manner; and a plurality of light-emergent components, arranged in a matrix at a light emergent surface of the light guide plate, and configured to guide the plurality of single-colored light beams transmitted within the light guide plate to be incident onto individual ones of the plurality of pixels of the display panel at positions of the plurality of light-emergent components.

5. The near-eye display device according to claim 4, wherein the plurality of light-emergent components comprise a plurality of light-extracting blocks arranged in a matrix on the light emergent surface of the light guide plate, a refractive index of the plurality of light-extracting blocks being larger than or equal to a refractive index of the light guide plate, and the plurality of light-emergent components being formed by the plurality of light-extracting blocks.

6. The near-eye display device according to claim 5, wherein the light guide device further comprises:

a filling layer, on the light-emergent surface of the light guide plate and covering the plurality of light-emergent components, the refractive index of the light guide plate being larger than each of a refractive index of the filling layer which is in contact with the light guide plate and a refractive index of the substrate.

7. The near-eye display device according to claim 4, wherein the positions of the plurality of light-emergent components are set to be in one-to-one correspondence with positions of individual ones of the plurality of pixels of the display panel.

8. The near-eye display device according to claim 7, wherein the positions of the plurality of light-emergent components and the positions of individual ones of the plurality of pixels of the display panel are set such that the plurality of single-colored light beams are transmitted to individual ones of the plurality of pixels after exiting the plurality of light-emergent components.

9. The near-eye display device according to claim 8, wherein orthogonal projections of the plurality of light-emergent components on the display panel at least partially overlap with respective ones of the plurality of pixels.

10. The near-eye display device according to claim 1, wherein the display panel comprises: a first substrate and a second substrate provided opposite to each other, without any color filter layer being disposed on either one of the first substrate and the second substrate; and a liquid crystal layer interposed between the first substrate and the second substrate.

11. The near-eye display device according to claim 1, wherein the light-splitting device comprises a plurality of light-splitters arranged in a matrix on the light-emergent surface of the display panel, a position of each of the plurality of light-splitters being in one-to-one correspondence with a position of a respective one of the plurality of pixels of the display panel, and the plurality of light-splitters in one-to-one correspondence with respective ones of the plurality of pixels at different positions on the display panel differing in structure thereof from one another.

12. The near-eye display device according to claim 11, wherein each of the plurality of light-splitters comprises a plurality of sub-splitters arranged regularly, each of which is configured to transmit a respective sub-beam of a plurality of sub-beams produced by splitting a respective one of the plurality of light beams from individual ones of the plurality of pixels, towards a respective one of the plurality of viewpoints of the human eye.

13. A virtual/augmented reality apparatus, comprising the near-eye display device according to claim 1.

14. A near-eye display method for human eye of an observer, comprising:

emitting a plurality of single-colored light beams by a light source device sequentially in a display period, the plurality of single-colored light beams being incident angularly onto a light guide device located on a light-emergent side of the light source device;

receiving and transmitting the plurality of single-colored light beams from the light source device by the light guide device to guide the plurality of single-colored light beams to emit outwards from a light-emergent side of the light guide device and then be incident on a display panel;

controlling, by the display panel located on the light-emergent side of the light guide device and comprising a plurality of pixels, both color and grayscale of emergent light beams generated by the plurality of single-colored light beams which are incident on the display panel and transmitted through the plurality of pixels, within an one-frame display period, the display period being equal to the one-frame display period; and splitting emergent light beams from individual ones of the plurality of pixels into a plurality of sub-beams propagating towards a plurality of viewpoints of the human eye respectively, by a light-splitting device.

15. The near-eye display method according to claim 14, wherein the light source device comprises a light-emitting device, a pre-collimator and a light-incident portion, the light-emitting device comprising a plurality of single-colored light-beam sources which are arranged in a vertical direction and spaced apart from one another, and the step of "emitting a plurality of single-colored light beams by a light source device sequentially, the plurality of single-colored light beams being incident angularly onto a light guide device located on a light-emergent side of the light source device" comprises:

sequentially emitting the plurality of single-colored light beams having different colors respectively, in the display period, by the light-emitting device;

utilizing the pre-collimator to transmit the plurality of single-colored light beams to be incident onto the light-incident portion at respective predetermined angles, with the single-colored light beams of each color being incident onto the light-incident portion at a same angle, but light beams of different colors being incident onto the light-incident portion at different incidence angles; and utilizing a wedge reflective surface of the light-incident portion to transmit the plurality of single-colored light beams to be incident angularly onto the light guide device, respectively.

16. The near-eye display method according to claim 15, wherein the step of "sequentially emitting the plurality of single-colored light beams having different colors respectively, in a display period, by the light-emitting device" comprises:

emitting in each of a plurality of light-emitting time periods within an one-frame display period single-colored light beams of a respective one color.

17. The near-eye display method according to claim 14, wherein the light guide device comprises a light guide plate and a plurality of light-emergent components, and the step of "receiving and transmitting the plurality of single-colored light beams from the light source device by the light guide device to guide the plurality of single-colored light beams to emit outwards from a light-emergent side of the light guide device and then be incident on a display panel" comprises:

transmitting the plurality of single-colored light beams towards the plurality of light-emergent components in a total-reflection manner by the light guide plate; and guiding the plurality of single-colored light beams, which are transmitted within the light guide plate, by the plurality of light-emergent components to be incident onto individual ones of the plurality of pixels of the display panel at positions of the plurality of light-emergent components.

18. The near-eye display method according to claim 14, wherein the step of "controlling, by the display panel located on the light-emergent side of the light guide device and comprising a plurality of pixels, both color and grayscale of emergent light beams generated by the plurality of single-colored light beams which are incident on the display panel and transmitted through the plurality of pixels" comprises:

implementing a control on both color and grayscale of a respective emergent light beam of each of the plurality of pixels within a display period, by utilizing a respective data signal applied to said each of the plurality of pixels through a respective data line by the display panel to adjusting grayscale of the respective emergent light beam emitted outwards from said each of the plurality of pixels within the display period.

19. The near-eye display method according to claim 15, wherein the step of "controlling, by the display panel located on the light-emergent side of the light guide device and comprising a plurality of pixels, both color and grayscale of emergent light beams generated by the plurality of single-colored light beams which are incident on the display panel and transmitted through the plurality of pixels" comprises:

implementing a control on both color and grayscale of a respective emergent light beam of each of the plurality of pixels within the display period, by utilizing a respective data signal applied to said each of the plurality of pixels through a respective data line by the display panel to adjusting grayscale of the respective emergent light beam emitted outwards from said each of the plurality of pixels within the display period.

20. The near-eye display method according to claim 16, wherein the step of "controlling, by the display panel located on the light-emergent side of the light guide device and comprising a plurality of pixels, both color and grayscale of emergent light beams generated by the plurality of single-colored light beams which are incident on the display panel and transmitted through the plurality of pixels" comprises:

implementing a control on both color and grayscale of a respective emergent light beam of each of the plurality of pixels within the display period, by utilizing a respective data signal applied to said each of the plurality of pixels through a respective data line by the display panel to adjusting grayscale of the respective emergent light beam emitted outwards from said each of the plurality of pixels within the display period.

* * * * *